(12) United States Patent
Kwatra (10) Patent No.: US 11,392,520 B1
(45) Date of Patent: Jul. 19, 2022

(54) TIMING ADJUSTMENT TO UNUSED UNIT-INTERVAL ON SHARED DATA BUS

(71) Applicant: Cirrus Logic International Semiconductor Ltd., Edinburgh (GB)

(72) Inventor: Nitin Kwatra, Austin, TX (US)

(73) Assignee: Cirrus Logic, Inc., Austin, TX (US)

( * ) Notice: Subject to any disclaimer, the term of this patent is extended or adjusted under 35 U.S.C. 154(b) by 0 days.

(21) Appl. No.: 17/166,231

(22) Filed: Feb. 3, 2021

(51) Int. Cl.
*G06F 13/20* (2006.01)

(52) U.S. Cl.
CPC .................................. *G06F 13/20* (2013.01)

(58) Field of Classification Search
CPC ...................... H04L 12/40006; H04W 24/10
See application file for complete search history.

(56) References Cited

U.S. PATENT DOCUMENTS

| | | | | |
|---|---|---|---|---|
| 9,705,697 B1* | 7/2017 | Tomita | ................. | H04L 25/4902 |
| 2009/0011713 A1* | 1/2009 | Abusubaih | .............. | G01S 11/02 |
| | | | | 455/67.11 |
| 2011/0092226 A1* | 4/2011 | Maher | ................... | H04W 64/00 |
| | | | | 455/456.2 |
| 2011/0217987 A1* | 9/2011 | van De Groenendaal | ................... | |
| | | | | H04H 60/51 |
| | | | | 455/456.1 |
| 2015/0350946 A1* | 12/2015 | Das | ......................... | H04W 4/80 |
| | | | | 455/41.2 |

* cited by examiner

*Primary Examiner* — Getente A Yimer
(74) *Attorney, Agent, or Firm* — Norton Rose Fulbright US LLP (57) ABSTRACT

Calibrating devices communicating on the shared bus can assist in reducing conflicts on the bus and the resulting loss of data. For example, the timing of transmission of data from one device to another device on the shared bus may be adjusted to compensate for delays on the shared bus. For example, the transmitting device may adjust transmission to an earlier time than the programmed time by an amount proportional to a known delay, such that the signal arrives at a receiving device at the programmed time. When the adjustment is not able to obtain a desired alignment or would cause conflicts on the shared data bus, the timing may be adjusted to delay the transmission, rather than advance the transmission, such that the adjusted transmission time results in the receipt of the signal at the receiving device in an unused time window after the programmed time.

20 Claims, 5 Drawing Sheets

TIMING ADJUSTMENT TO UNUSED UNIT-INTERVAL ON SHARED DATA BUS

FIELD OF THE DISCLOSURE

The instant disclosure relates to data bus communications. More specifically, portions of this disclosure relate to calibrating timing on a shared data bus interconnecting a host to several client devices.

BACKGROUND

If multiple devices on a shared data bus transmit data at the same time, the data may be lost due to conflicts between signals on the shared bus. For example, two devices may transmit two different electrical signals onto a conductor wire that is part of the shared data bus. In this example, the signals will collide, resulting in both signals becoming unintelligible to other devices on the shared data bus. The number of devices communicating on a shared data bus is increasing in consumer devices recently because the number of features desired in consumer devices is increasing. Additional features may involve the addition of more devices communicating with each other to coordinate functionality for a user of the consumer devices. An alternative to sharing a data bus is to have separate busses between each of the devices. However, as the number of devices increases, the number of busses rapidly increases. Each data bus requires additional circuit board space that negatively affects the form factor of the consumer device by increasing the complexity of making smaller form factors.

Shortcomings mentioned here are only representative and are included to highlight problems that the inventors have identified with respect to existing information handling systems and sought to improve upon. Aspects of the information handling systems described below may address some or all of the shortcomings as well as others known in the art. Aspects of the improved information handling systems described below may present other benefits than, and be used in other applications than, those described above.

SUMMARY

Calibrating devices communicating on the shared bus can assist in reducing conflicts on the bus and the resulting loss of data. For example, the timing of transmission of data from one device to another device on the shared bus may be adjusted to compensate for delays on the shared bus. For example, the transmitting device may adjust transmission to an earlier time than the programmed time by an amount proportional to a known delay, such that the signal arrives at a receiving device at the programmed time. When the adjustment is not able to obtain a desired alignment or would cause conflicts on the shared data bus, the timing may be adjusted to delay the transmission, rather than advance the transmission, such that the adjusted transmission time results in the receipt of the signal at the receiving device in an unused time window on the shared data bus after the programmed time. The re-use of the unused time window on the shared data bus in this manner allows for the shared data bus to accommodate a larger range of clock rates at longer channel distances. Re-using the unused time window allows the shared data bus to accommodate longer channel distances with limited or no loss of bandwidth.

According to one embodiment, an apparatus may include a data bus interface configured to communicate with a plurality of devices over a data bus by time division multiplexing of the data bus into a plurality of unit-intervals, each unit-interval assigned to either one device of the plurality of devices or as a turnaround unit-interval between communications with different devices of the plurality of devices. The data bus interface may be coupled to transceiver circuitry for generating electrical signals on the data bus that convey data, which may be any of commands, control bits, and/or user data such as audio content. In some embodiments, the data bus interface is configured to receive data from a differential pair of conductors. The transceiver may include logic circuitry and/or memory for storing configurations, such as a setting for an adjustment to a transmission time for signals transmitted by the transceiver. The transceiver may be configured to adjust transmissions by performing steps including determining a delay between transmission of a first signal over a shared data bus from a first device and reception of the first signal at a second device; adjusting a transmission time for a second signal for transmission over the shared data bus from the first device based, at least in part, on the delay, wherein the adjusting is by an amount to align the second signal to a certain receiving time at the second device, wherein the certain receiving time is later than a programmed receiving time; and/or transmitting the second signal to the second device on the shared data bus based on the adjusting of the transmission time.

In certain embodiments, the programmed receiving time is an assigned unit-interval on the shared data bus for the first device, wherein the assigned unit-interval is bounded by single unused unit-intervals separating the assigned unit-interval from unit-intervals for other devices coupled to the shared data bus. The adjusting of the transmission time may include adjusting by an amount to align the second signal with an unused unit-interval after the assigned unit-interval. In some example embodiments, adjusting of the transmission time may include adjusting by an amount to align the second signal with an immediately next unit-interval after the assigned unit-interval. Logic circuitry within the transceiver may be configured to perform the adjustment determination by first determining an adjustment based on the delay would create a conflict on the shared data bus; and subsequently, when the adjustment based on the delay would create a conflict on the shared data bus, adjusting the transmission time by aligning the second signal with an unused unit-interval after the assigned unit-interval.

According to another embodiment, an apparatus may include a host device coupled to a shared data bus and configured to transmit and receive to a plurality of devices coupled to the shared data bus. The apparatus may be, for example, a mobile device or another computing device. The host device and devices coupled to the shared data bus may be configured to operate according to various methods and techniques described herein.

The methods described herein may be embedded in a computer-readable medium as computer program code comprising instructions that cause a processor or other logic circuitry to perform the steps of the method. In some embodiments, the processor may be part of an information handling system including a first network adaptor configured to transmit data over a first network connection of a plurality of network connections; and a processor coupled to the first network adaptor, and the memory. In some embodiments, the network connection may couple the information handling system to an external component, such as a wired or wireless docking station.

As used herein, the term "coupled" means connected, although not necessarily directly, and not necessarily mechanically; two items that are "coupled" may be unitary with each other. The terms "a" and "an" are defined as one or more unless this disclosure explicitly requires otherwise. The term "substantially" is defined as largely but not necessarily wholly what is specified (and includes what is specified; e.g., substantially parallel includes parallel), as understood by a person of ordinary skill in the art.

The phrase "and/or" means "and" or "or". To illustrate, A, B, and/or C includes: A alone, B alone, C alone, a combination of A and B, a combination of A and C, a combination of B and C, or a combination of A, B, and C. In other words, "and/or" operates as an inclusive or.

Further, a device or system that is configured in a certain way is configured in at least that way, but it can also be configured in other ways than those specifically described.

The terms "comprise" (and any form of comprise, such as "comprises" and "comprising"), "have" (and any form of have, such as "has" and "having"), and "include" (and any form of include, such as "includes" and "including") are open-ended linking verbs. As a result, an apparatus or system that "comprises," "has," or "includes" one or more elements possesses those one or more elements, but is not limited to possessing only those elements. Likewise, a method that "comprises," "has," or "includes," one or more steps possesses those one or more steps, but is not limited to possessing only those one or more steps.

The foregoing has outlined rather broadly certain features and technical advantages of embodiments of the present invention in order that the detailed description that follows may be better understood. Additional features and advantages will be described hereinafter that form the subject of the claims of the invention. It should be appreciated by those having ordinary skill in the art that the conception and specific embodiment disclosed may be readily utilized as a basis for modifying or designing other structures for carrying out the same or similar purposes. It should also be realized by those having ordinary skill in the art that such equivalent constructions do not depart from the spirit and scope of the invention as set forth in the appended claims. Additional features will be better understood from the following description when considered in connection with the accompanying figures. It is to be expressly understood, however, that each of the figures is provided for the purpose of illustration and description only and is not intended to limit the present invention.

BRIEF DESCRIPTION OF THE DRAWINGS

For a more complete understanding of the disclosed system and methods, reference is now made to the following descriptions taken in conjunction with the accompanying drawings.

DETAILED DESCRIPTION

Figure 1:
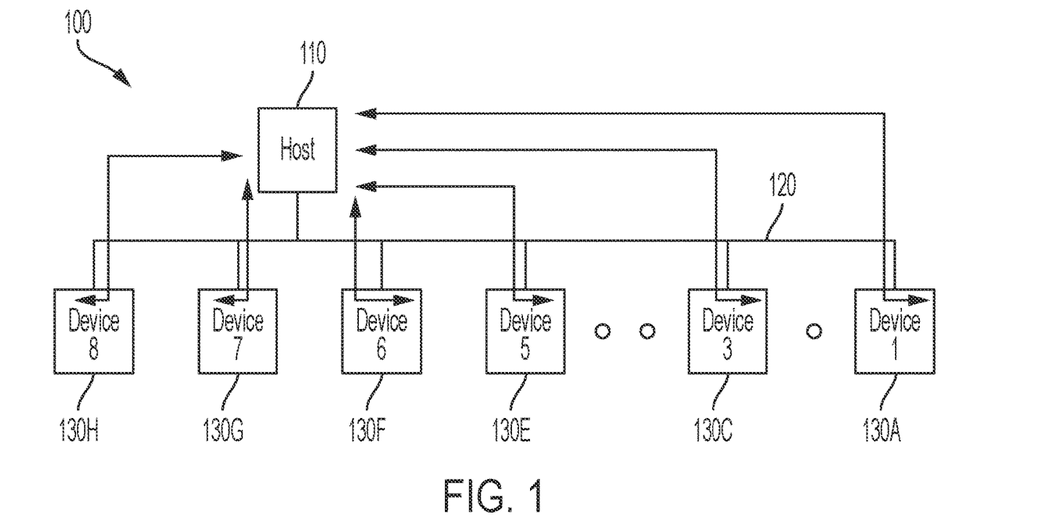
FIG. 1 is a block diagram illustrating an example communications system involving a host device and several client devices communicating over a shared bus according to some embodiments of the disclosure.

FIG. 1 is a block diagram illustrating an example communications system involving a host device and several client devices communicating over a shared bus according to some embodiments of the disclosure. A system 100 includes a first device, shown as a host device 110 communicating on a shared bus 120 with eight client devices 130A-H. The shared bus 120 may be, for example, a pair of wires configured to be used for differential signaling, such as low-voltage differential signaling (LVDS). Each of the devices 110 and 130A-H may include transceiver circuitry for conveying and/or receiving electrical signals over the shared bus 120 to convey information between the devices. Although eight devices are shown communicating over the shared bus 120, more than eight or fewer than eight devices may be coupled to the shared bus 120. Further, although the devices may be referred to as a host or client device, the host and client devices may be identical or different in circuitry configuration and may trade functionality on the shared bus 120 such that when there is a difference in functionality between host and client devices, the devices may be reconfigurable from host to client or client to host. In some embodiments, the host device 110 may communicate with each of the client devices 130A-H, but each of the client device 130A-H may communicate only with the host device 110. In some embodiments, even when the client devices 130A-H communicate directly only with the host device 110, the data on the shared bus may be visible to all other client devices 130A-H such that client devices 130A-H may indirectly communicate with each other through control of the host device 110.

Figure 2:
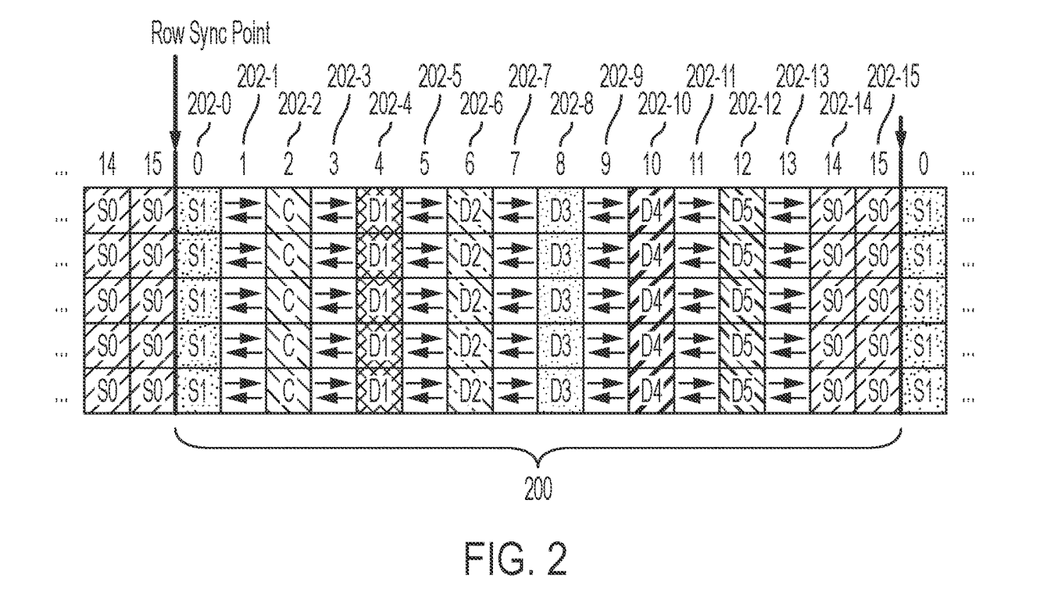
FIG. 2 is a block diagram illustrating an example time division multiplexing scheme for several client devices to communicate using a shared bus with a single unit-interval turnaround according to some embodiments of the disclosure.

Communications on the shared bus 120 from the client devices 130A-H may be performed according to a time divisional multiplexing scheme in which each of the client devices 130A-H is allotted a specific time for transmitting data. In some embodiments, the time division multiplexing involves dividing the available time on the shared bus 120 into unit-intervals of time. Those unit-intervals may be assigned to the devices 130A-H in an equal, sequential manner as illustrated in FIG. 2, or assigned according to different techniques. For example, other techniques may provide an unequal distribution of unit-intervals to the devices 130A-H. Additionally, some unit-intervals of the shared bus 120 may be used to synchronize timing of communications on the shared bus 120 and/or may be used by the host device 110 to send control information to devices 130A-H.

One example timing diagram for communicating in unit-intervals on the shared bus 120 is shown in FIG. 2. FIG. 2 is a block diagram illustrating a time division multiplexing scheme for several client devices to communicate using a shared bus with a single unit-interval turnaround according to some embodiments of the disclosure. A timing period 200 includes unit-intervals 202-0, 202-1, 202-2, . . . 202-15. The example timing 200 may be repeated periodically on the shared bus in fifteen unit-interval patterns. Within the unit-intervals, some unit-intervals may be used for synchronization of communication on the shared bus. For example, unit-intervals 202-14 and 202-15 in each period 200 include 'S0' synchronization unit-intervals in which a zero bit is transmitted by the host device 110. A corresponding 'S1' synchronization unit-interval in which a one bit is transmitted by the host device 110 may be transmitted in unit-interval 202-0. Each of the devices 130A-H may identify the known S0-S0-S1 bit sequence on the shared bus to establish a coarse timing for the unit-intervals 202-0-202-15. The transition from zero to one in the S0-S0-S1 bit sequence may establish the start of each timing period 200.

The host device 110 may also communicate a control bit in unit-interval 202-2. The devices coupled to the shared bus may communicate in assigned unit-intervals, such as unit-interval 202-4 for a first device (D1), unit-interval 202-6 for a second device (D2), unit-interval 202-8 for a third device (D3), unit-interval 202-10 for a fourth device (D4), and unit-interval 202-12 for a fifth device (D5). Each of the unit-intervals for communications may be separated by turn-around periods. The timing period 200 illustrates one unit-interval turn-around periods in unit-intervals 202-1, 202-3, 202-5, 202-7, 202-9, 202-11, and 202-13. Although only five unit-intervals for communicating with five devices D1-D5 are illustrated in the timing period 200, the timing period 200 may be adjusted to accommodate more or less devices, and in some embodiments a larger assigned number (e.g., 2, 3, 4 or more) of unit-intervals for device communications.

Figure 3:
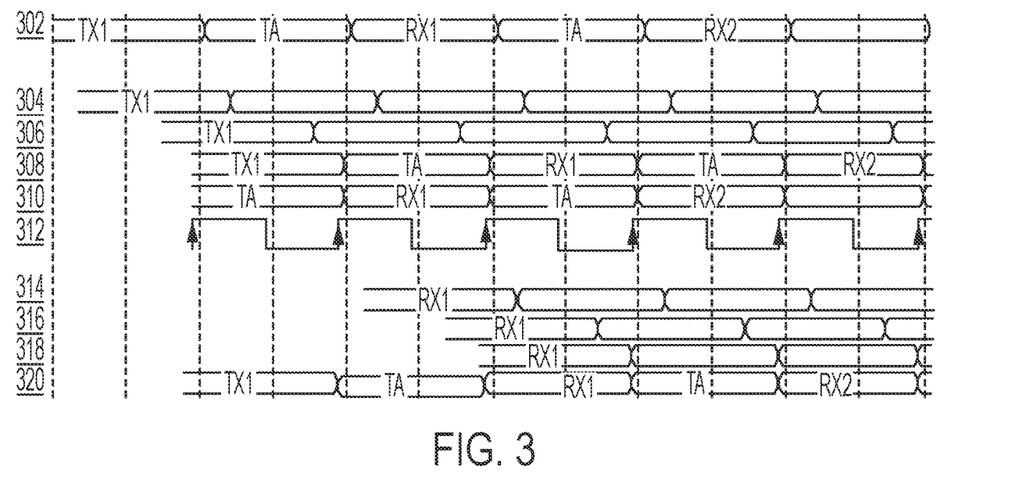
FIG. 3 is an example timing diagram illustrating communications timing between a host device and another device on a shared bus.

Propagation of a signal along the shared bus, and/or within the circuitry coupled to the shared bus, may shift the arrival of a signal outside of an expected arrival time. The information in a signal arriving outside of the expected arrival time may be lost because the receiving device may not process the signal correctly to recover the data. Further, due to the delayed arrival, a conflict on the shared bus caused by a transmission from another transmitter on the shared bus may result in destruction of the information in the signal. One example scenario involving the signal propagation delay is shown in FIG. 3. Row 302 in the signal timing diagram of FIG. 3 illustrates an expected timing at a host device for scheduling of transmissions from the host device to the devices on the shared bus and transmission from the devices to the host device on the shared bus. For example, the time window TX1 is one unit-interval for transmitting from the host device to a first device, the time window TA is a one unit-interval for turn-around between device transmissions, the time window RX1 is a one unit-interval for transmitting from the first device to the host device, and the time window RX2 is a one unit-interval for transmitting from a second device to the host device.

The time windows on row 302 expected by the host device may not align with actual data propagating through the devices and shared bus as shown in rows 304, 306, 308, 310, 314, 316, 318, and 320. Row 304 illustrates corresponding time windows at the host device post-transmission. Row 306 illustrates corresponding time windows at the first device pre-reception. Row 308 illustrates corresponding time windows at the first device post-reception. Row 312 illustrates a clock signal internal to the first device that is generated and used for identifying the time windows on the shared bus. Row 314 illustrates time windows at the shared bus near the first device for data transmitted from the first device to the host device post-transmission from the first device. Row 316 illustrates corresponding time windows at the host device pre-reception. Row 318 illustrates corresponding time windows at the host device post-reception. Row 320 illustrates the corresponding time windows in the logic circuitry at the host device. Comparing row 302 to row 320 demonstrates that the delays in conveying a signal from the host device to the first device and back from the first device to the host device have cumulatively added to shift the time window RX1 to a different unit-interval in row 320 than the expected time window RX1 shown in row 302. The time window RX1 in row 302 may be the programmed receiving time, referring to the time when the host device expects to process signals on the shared bus.

Figure 4:
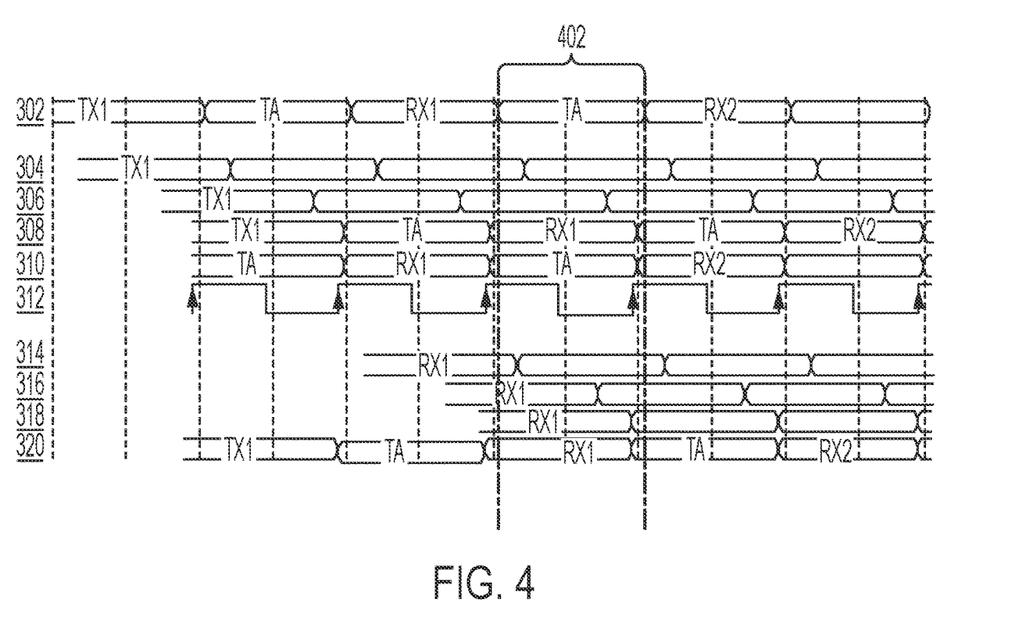
FIG. 4 is an example timing diagram illustrating communications timing between a host device and another device on a shared bus.

FIG. 4 illustrates the misalignment of a signal from a receiving time (e.g., the time window RX1) from the programmed receiving time. A time window 402 shows that the signal with data transmitted from the first device to the host device over the shared bus arrives at the host device in the RX1 window of row 320. However, the host device expected the signal to arrive in the time window RX1 of row 302. Instead, the signal, due to propagation through the communication channel in the transceiver circuitry and the shared bus, arrives during the turn-around unit-interval TA. As a result, the host device does not correctly process the signal to obtain the data transmitted by the first device and the data is lost.

In some embodiments, the delay may be compensated for by having the transmitting device transmit using an advance timing that begins the propagation of the signal along the conductors at an earlier time that results in the signal arriving at the receiving device during a time window corresponding to a programmed receiving time. The delay compensation may include determining, such as by measuring, a delay in reception at the host device of the first signal from the transmission of the first signal by the first device. This measured delay may account for delays in the transceiver circuitry of the transmitting and/or receiving device. This measured delay may additionally or alternatively account for delays due to distance between the transmitting and/or receiving device. In some embodiments, the delays may be separately determined. With the determined delay, the transceiver may adjust a transmission time for transmitted signal based, at least in part, on the delay. The adjustment may be by an amount to align the transmitted signal to a certain receiving time at the first device. For example, referring to FIG. 5, a transmission intended for time window RX1 can be advanced by a timing adjustment 502 from time 510 to time 512 to align row 320 with row 302. Advancing the timing further than time 512, such as into the left of the time window 514 may cause a conflict on the shared bus because the device would be transmitting onto the shared bus simultaneously with another device transmitting for a different time window, such as when the host device is transmitting during time window TX1. In some embodiments, the timing adjustment after calibration adjusts backwards in time the RX1 in row 314 to create alignment at the host device. As the round trip time increases, the window 514 shortens. The window thus becomes a measure of how much more round trip delay can be tolerated before the conflict happens. If this window length is greater than zero, the conflict on the bus may be avoided by timing adjustment backwards. If this window 514 reaches zero and further timing adjustment is determined to be needed, then the timing adjustment may advance the transmission to the next unit-interval.

Figure 5:
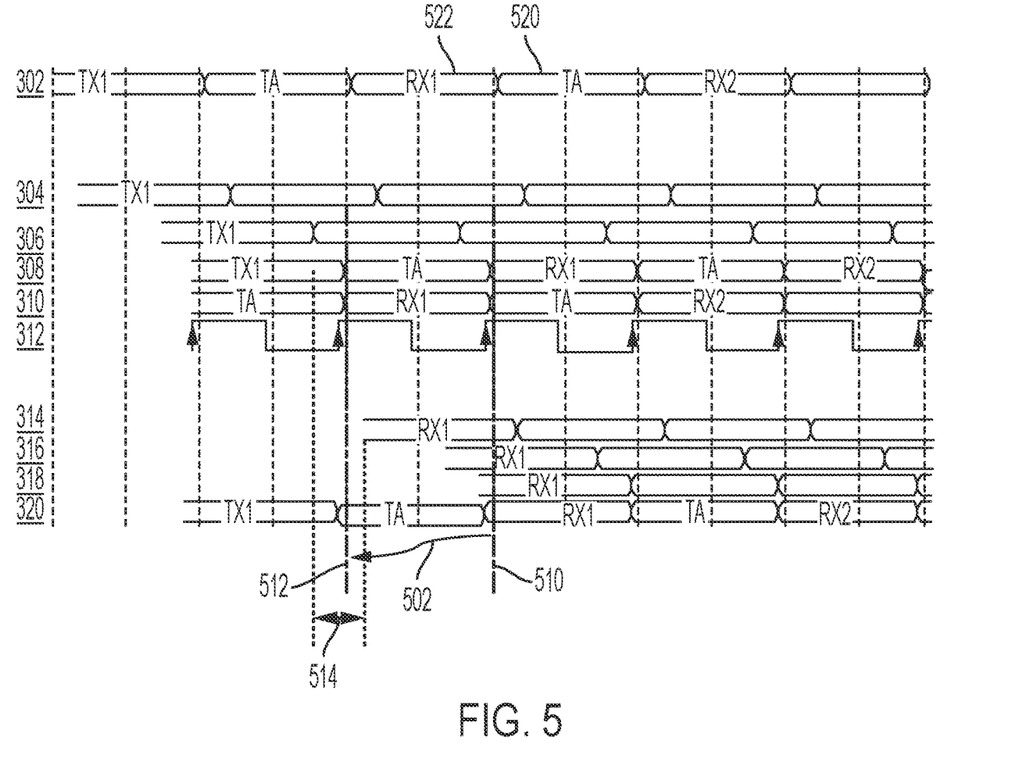
FIG. 5 is an example timing diagram illustrating communications timing between a host device and another device on a shared bus.

If no advance timing is available that would align a receiving device's programmed time window with the signal from the transmitting device without causing a conflict, the adjusting may be performed such that the certain receiving time after adjustment is later than a programmed receiving time. For example, a subsequent turn-around time window TA may be used for transmitting the signal to the receiving device. Referring to FIG. 5, such an adjustment may result in the time 510 being advanced to align with the turn-around time window 520, rather than the programmed time window RX1 522. After adjusting a timing for a transmitting signal to a time that results in an arrival after the programmed receiving time, the transmitting device may transmit the signal according to the adjusted timing. Not restricting alignment of the signal transmission to a programmed receiving time may be advantageous by allowing transmissions to proceed without modifying the transmission scheme. If alignment with the programmed times is required, additional turn-around time windows TA would be required to accommodate longer delays when communicating on the shared bus, such as to accommodate high clock rates and/or long transmission distances. Additional turn-around time windows TA would waste bandwidth on the shared bus because the turn-around time windows TA do not carry any data. More turn-around time windows TA would idle the bus for longer periods, reducing capacity for carrying data.

Figure 6:
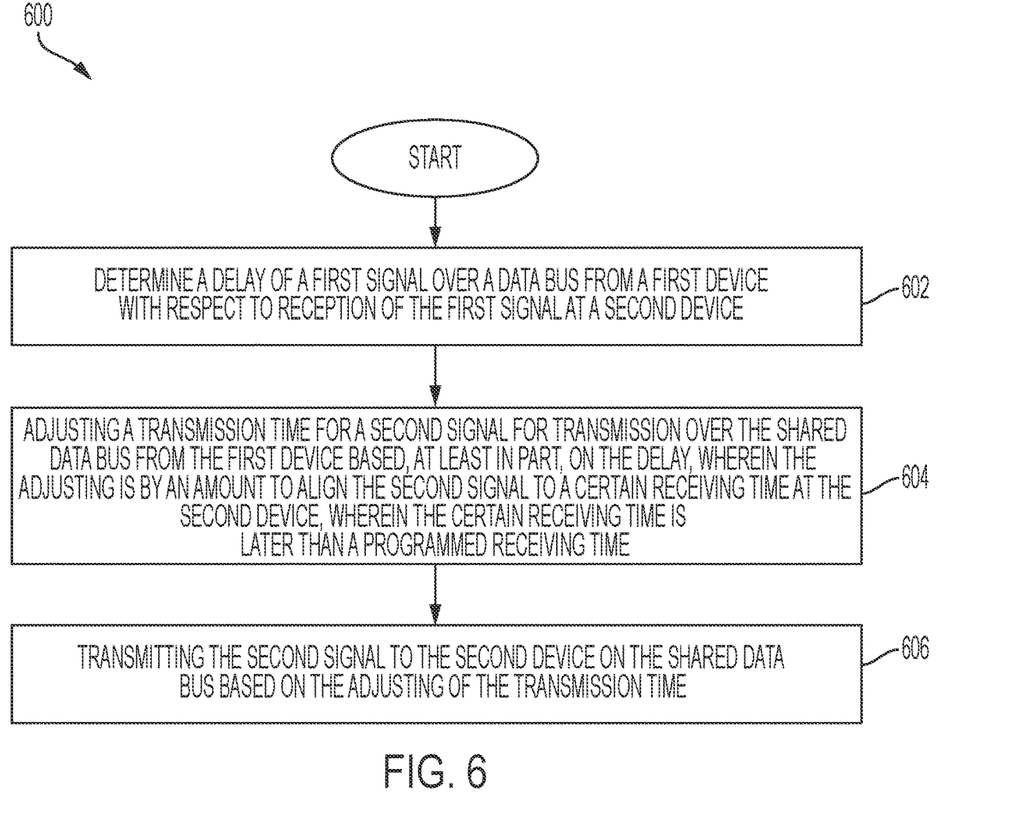
FIG. 6 is a flow chart illustrating an example method of communicating on a shared bus by adjusting timing to avoid a conflict on the shared bus.

A method for transmitting over a shared bus is shown in FIG. 6. The method 600 may include, at block 602, determining a delay of a first signal over a data bus from a first device with respect to the reception of the first signal at a second device. The first signal may be a test signal used only for measuring delay, and may be used to measure a round trip delay observed as a difference between the programmed time at the receiver and the actual time of the signal's arrival at the receiver. The measurement may be performed by having the transmitter continue to move the transmission time until the signal arrives at the programmed time at the receiver. The amount that the transmission time is moved in such a test corresponds to the round trip delay. The first signal may alternatively be a signal carrying data from the first device to the receiving device, such as a host device, and the method 600 is carried out to adjust transmissions during communications over the shared bus. In some embodiments, the delays between a host device and each of the devices may be separately measured and/or the delays in both directions separately measured and stored. Then, these delays may be used to adjust the transmission time in block 604. For example, the measured delays of a second device may be used in adjusting transmission time of a first device. The transmission time adjustments may be determined that allow waves to cross each other on the shared bus without colliding at or near end points of the shared bus. Whether they will do that or not may be estimated if both the forward (fwd) and back delays are known. Another example may be a set of three devices where the two outside ones are trying to send a message to the center one. Both messages are not to reach at the same time, and this situation too may be helped by the knowledge of individual delays.

In one embodiment, the delay may be measured by comparing a received time of the first signal after processing with a programmed receiving time based on an internal clock of the device. That measured delay may include contributions from propagation delay along the shared bus and delay inserted by transceiver circuitry at the transmitting device and/or the receiving device. In one embodiment, the delay may be measured using a chain of delay elements whose total delay is selectable through a control signal. Other techniques for determining the delay may also be used as part of the transmission time adjustment.

The method may continue to block 604 with adjusting a transmission time for a second signal for transmission over the data bus to the first device based, at least in part, on the determined delay of block 602. The adjustment may be by an amount to align the second signal to a certain receiving time at the first device corresponding to a programmed receiving time. However, when determining the adjustment, the device may determine that the adjustment to align with the programmed receiving time is unavailable, such as because the adjustment would create a conflict on the shared bus. When the adjustment to an earlier time is unavailable, the adjustment may be determined to be an amount to obtain a certain receiving time that is later than the programmed receiving time. In some embodiments, the transmission time adjustment may result in aligning the receiving time with an unused unit-interval at the receiving device, such as a turn-around time window TA, after the programmed receiving window, such as the receive time window RX1. In some embodiments, the later time window may be the immediately next unit-interval on the shared data bus. In some embodiments, the later time window may be several unit-intervals later.

In some embodiments, a calibration procedure may be used to obtain the adjusted transmission timing of block 604. The calibration procedure may use a search algorithm to determine the transmission timing adjustment. The search algorithm may be executed by the host device, which transmits instructions to one or more devices on the shared bus to adjusting timing at the device for transmitting a signal until the received signal arrives at the host during a programmed receiving time at the host device. In some embodiments, a table may be used to determine an adjustment from a determined delay. For example, a delay may be measured and then a closest table entry matched to the measured delay to look-up a timing adjustment for transmission on the shared bus. In some embodiments, the calibration may be performed by adjusting a delay chain corresponding to the determined delay and/or round trip delay of block 602. The delay chain may include a plurality of series-connected inverters, in which the number of active inverters in the delay chain is adjusted to change transmission timing. For example, some switches may be coupled in parallel with inverters in the delay chain, and the switches used to short out inverters in the chain to shorten the delay through the delay chain.

The method may continue to block 606 with transmitting the second signal to the first device on the shared data bus using the adjusted transmission time. By transmitting the signal using the adjusted transmission time, such as to align transmission with unused time windows, the utilization of the shared bus may be improved and thus the available bandwidth increased. This may accommodate maintaining or reducing loss of bandwidth when large delays occur due to long channel lengths on the shared bus and/or other delays in transceiver circuitry coupled to the shared bus. Additionally, in a circuit with an imperfect termination that results in signal deterioration at the receiving device, the delay compensation may improve the likelihood of correct data reception.

In some embodiments, the method 600 of FIG. 6 may be performed by a host device as part of a calibration routine or start-up routine with the first device being a client device coupled to the shared bus. In some embodiments, the method 600 may be performed by a client device coupled to the shared bus by transmitting signals to the host device. For example, the host device may instruct devices on the shared data bus to perform or participate in measurements of delay on the shared data bus. The determination of the transmission time may be performed at the host device and communicated through commands or control bits to one or more devices on the shared data bus, and may include communicating a different transmission time adjustment for each of the devices or a common adjustment for all devices. The determination of the transmission time may alternatively be performed at the device and the adjustment communicated through commands or control bits to the host device, after which the host device updates settings stored in memory and applies the new adjustment when receiving data from the device.

Figure 7:
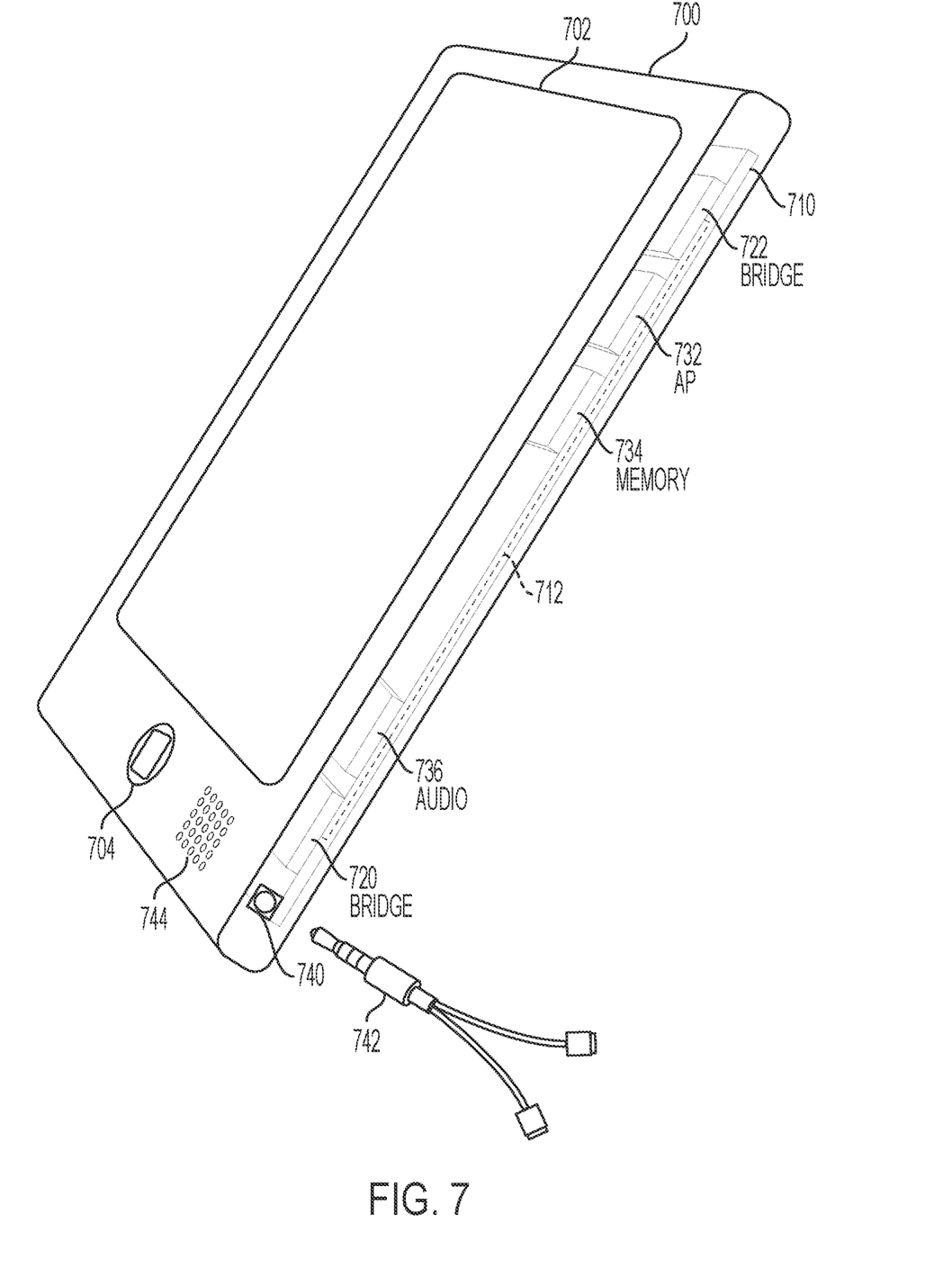
FIG. 7 is a drawing illustrating an example mobile device having a shared bus for communicating between several client devices according to some embodiments of the disclosure.

These example embodiments describe and illustrate various communication techniques for electronic devices to communicate over a shared bus. The techniques may be employed in mobile devices to enable and enhance communications between electronic devices within the mobile device. FIG. 7 is a drawing illustrating a mobile device having a shared bus for communicating between several client devices according to some embodiments of the disclosure. A mobile device 700 may include a display 702 for allowing a user to provide user input to the mobile device 700. One or more physical buttons 704 may also allow a user to provide user input to the mobile device 700. The mobile device 700 may also include a printed circuit board (PCB) 710 interconnecting components that provide the functionality of mobile device 700. For example, an application processor (AP) 732, memory 734, and audio 736 components may be attached to the PCB 710. Communications between the components may be provided through a channel 712 formed as a differential pair of conductors on or in the PCB 710. The channel 712 may be a shared bus operated using communication techniques described above with one of the bridge chips 720 and 722 operating as a host device on the shared bus. Communication between bridge chips 720 and 722 coupled to endpoints of the channel 712 may include processing and memory circuitry that provide interfaces for receiving data from components 732, 734, and 736 and packaging the data for transmission on the channel 712. In some embodiments, the components 732, 734, and 736 may be coupled to the bridge chip 720 through a shared bus operated using communication techniques described above with the bridge chip 720 operating as a host device on the shared bus. The audio component 736 may provide an audio output signal to a headphone jack 740, for driving a transducer, such as headphones 742. The audio component 736 may also be coupled to an internal speaker 744. The audio component 736 may provide signal processing, digital-to-analog conversion (DAC), filtering, and/or amplification to audio files received from memory 734 for output to a user. Although the data received at the audio component 736 is described as received from memory 734, the audio data may also be received from other sources, such as a USB connection, a device connected through Wi-Fi to the mobile device 700, a cellular radio, an Internet-based server, another wireless radio, and/or another wired connection.

In some embodiments, the bridge chips 720 and 722 may be configured in a master-slave arrangement. For example, a host bridge chip 722 may be coupled to the AP 732 of mobile device 700 and slave bridge chip 720 may be coupled to a microphone, analog-to-digital converter (ADC), digital-to-analog converter (DAC), amplifier, digital signal processor (DSP), and/or (CODEC) within the mobile device. Embodiments of the present disclosure are useful for audio-enabled equipment. For example, multiple slave bridge chips may each individually be coupled to separate components, such as a microphone, speaker, and DAC, allowing the AP to communicate to the components through a single differential wired bus.

Techniques for communicating on a shared data bus as described in this disclosure may be applied to one or more communications within the mobile device 700. For example, the techniques may be applied to communication between bridge chip 720, as a host device, and several components including audio component 736. As another example, techniques described above may be applied to communication between bridge chip 722 and components 732 and 734 when components 732 and 734 share a data bus.

The schematic flow chart diagram of FIG. 6 is generally set forth as a logical flow chart diagram. As such, the depicted order and labeled steps are indicative of aspects of the disclosed method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagram, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The operations described above as performed by a host device may be performed by a controller embedded in the host device, a controller coupled to the host device but external to the host device, and/or a combination of logic circuitry in the host device and external to the host device. The functionality may be performed by any circuit configured to perform the described operations. Such a circuit may be an integrated circuit (IC) constructed on a semiconductor substrate and include logic circuitry, such as transistors configured as logic gates, and memory circuitry, such as transistors and capacitors configured as dynamic random access memory (DRAM), electronically programmable read-only memory (EPROM), or other memory devices. The logic circuitry may be configured through hard-wire connections or through programming by instructions contained in firmware. Further, the logic circuitry may be configured as a general-purpose processor capable of executing instructions contained in software and/or firmware.

If implemented in firmware and/or software, functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise random access memory (RAM), read-only memory (ROM), electrically-erasable programmable read-only memory (EEPROM), compact disc read-only memory (CD-ROM) or other optical disk storage, magnetic disk storage or other magnetic storage devices, or any other medium that can be used to store desired program code in the form of instructions or data structures and that can be accessed by a computer. Disk and disc include compact discs (CD), laser discs, optical discs, digital versatile discs (DVD), floppy disks and Blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and certain representative advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As an example, although processing of certain kinds of data may be described in example embodiments, other kinds or types of data may be processed through the methods and devices described above. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method, comprising:
   determining a round trip delay between transmission of a first signal over a shared data bus from a first device and reception of the first signal at a second device;
   adjusting a transmission time for a second signal for transmission over the shared data bus from the first device based, at least in part, on the round trip delay, wherein the adjusting is by an amount to align the second signal to a certain receiving time at the second device, wherein the certain receiving time is later than a programmed receiving time; and
   transmitting the second signal to the second device on the shared data bus based on the adjusting of the transmission time.

2. The method of claim 1, wherein the programmed receiving time is an assigned unit-interval of the shared data bus, as measured at the first device, for the second device, wherein the assigned unit-interval is bounded by single unused unit-intervals separating the assigned unit-interval from unit-intervals for other devices coupled to the shared data bus.

3. The method of claim 2, wherein the adjusting of the transmission time comprises adjusting by an amount to align the second signal with an unused unit-interval after the assigned unit-interval.

4. The method of claim 3, wherein the adjusting of the transmission time comprises adjusting by an amount to align the second signal with an immediately next unit-interval after the assigned unit-interval.

5. The method of claim 1, wherein the programmed receiving time is an assigned unit-interval at the second device, and wherein the step of adjusting comprises:
   determining an adjustment based on the round trip delay would create a conflict on the shared data bus; and
   when the adjustment based on the round trip delay would create a conflict on the shared data bus, adjusting the transmission time by aligning the second signal to avoid or improve on the conflict.

6. The method of claim 1, wherein transmitting the first and the second signal comprises transmitting the first and the second signal to a host device.

7. The method of claim 6, wherein transmitting the second signal comprises transmitting the second signal over a low-voltage differential signaling (LVDS) interface to the host device.

8. The method of claim 1, wherein determining a round trip delay comprises adjusting a chain of delay elements through a control signal.

9. An apparatus, comprising:
   a transceiver configured to communicate on a data bus, wherein the transceiver is configured to perform steps comprising:
      determining a round trip delay between transmission of a first signal over a shared data bus from a first device and reception of the first signal at a second device;
      adjusting a transmission time for a second signal for transmission over the shared data bus from the first device based, at least in part, on the round trip delay, wherein the adjusting is by an amount to align the second signal to a certain receiving time at the second device, wherein the certain receiving time is later than a programmed receiving time; and
      transmitting the second signal to the second device on the shared data bus based on the adjusting of the transmission time.

10. The apparatus of claim 9, wherein the programmed receiving time is an assigned unit-interval on the shared data bus for the first device, wherein the assigned unit-interval is bounded by single unused unit-intervals separating the assigned unit-interval from unit-intervals for other devices coupled to the shared data bus.

11. The apparatus of claim 10, wherein the adjusting of the transmission time comprises adjusting by an amount to align the second signal with an unused unit-interval after the assigned unit-interval.

12. The apparatus of claim 11, wherein the adjusting of the transmission time comprises adjusting by an amount to align the second signal with an immediately next unit-interval after the assigned unit-interval.

13. The apparatus of claim 9, wherein the programmed receiving time is an assigned unit-interval on the data bus for the first device, and wherein the step of adjusting comprises:
    determining an adjustment based on the round trip delay would create a conflict on the shared data bus; and
    when the adjustment based on the round trip delay would create a conflict on the shared data bus, adjusting the transmission time by aligning the second signal with an unused unit-interval after the assigned unit-interval.

14. The apparatus of claim 9, wherein transmitting the second signal comprises transmitting the second signal to a host device.

15. The apparatus of claim 14, wherein transmitting the second signal comprises transmitting the second signal over a low-voltage differential signaling (LVDS) interface to the host device.

16. The apparatus of claim 9, wherein determining a round trip delay comprises adjusting a chain of delay elements through a control signal.

17. A mobile device, comprising:
a shared data bus;
a host device coupled to the host bus and configured to communicate with a plurality of client devices including a first client device,
wherein the first client device is coupled to the data bus and configured to perform steps comprising:
  determining a round trip delay between transmission of a first signal over a shared data bus from a first device and reception of the first signal at a second device;
  adjusting a transmission time for a second signal for transmission over the shared data bus from the first device based, at least in part, on the round trip delay, wherein the adjusting is by an amount to align the second signal to a certain receiving time at the second device, wherein the certain receiving time is later than a programmed receiving time; and
  transmitting the second signal to the second device on the shared data bus based on the adjusting of the transmission time.

18. The apparatus of claim 17, wherein the programmed receiving time is an assigned unit-interval on the shared data bus for the first device, wherein the assigned unit-interval is bounded by single unused unit-intervals separating the assigned unit-interval from unit-intervals for other devices coupled to the shared data bus, wherein the adjusting of the transmission time comprises adjusting by an amount to align the second signal with an unused unit-interval after the assigned unit-interval, and wherein the adjusting of the transmission time comprises adjusting by an amount to align the second signal with an immediately next unit-interval after the assigned unit-interval.

19. The apparatus of claim 17, wherein the programmed receiving time is an assigned unit-interval on the data bus for the first device, and wherein the step of adjusting comprises:
  determining an adjustment based on the round trip delay would create a conflict on the shared data bus; and
  when the adjustment based on the round trip delay would create a conflict on the shared data bus, adjusting the transmission time by aligning the second signal with an unused unit-interval after the assigned unit-interval.

20. The apparatus of claim 17, wherein transmitting the second signal comprises transmitting the second signal over a low-voltage differential signaling (LVDS) interface to the host device.

* * * * *

UNITED STATES PATENT AND TRADEMARK OFFICE
CERTIFICATE OF CORRECTION

| | | |
|---|---|---|
| PATENT NO. | : 11,392,520 B1 | |
| APPLICATION NO. | : 17/166231 | |
| DATED | : July 19, 2022 | |
| INVENTOR(S) | : Nitin Kwatra | |

It is certified that error appears in the above-identified patent and that said Letters Patent is hereby corrected as shown below:

In the Specification

In Column 9, Lines 49-50, delete "digital-to-analog conversion (DAC)," and insert -- digital-to-analog converter (DAC), --, therefor.

In the Claims

In Column 13, Line 22, in Claim 18, delete "apparatus" and insert -- mobile device --, therefor.

In Column 14, Line 10, in Claim 19, delete "apparatus" and insert -- mobile device --, therefor.

In Column 14, Line 20, in Claim 20, delete "apparatus" and insert -- mobile device --, therefor.

Signed and Sealed this
Nineteenth Day of September, 2023

Katherine Kelly Vidal
*Director of the United States Patent and Trademark Office*